Patented July 18, 1950

2,515,758

UNITED STATES PATENT OFFICE 2,515,758

ALKYD RESINS DERIVED FROM CYCLOHEXENE OXIDE

Michel F. Cukier, New York, N. Y., assignor to Pharma Chemical Corporation, New York, N. Y., a corporation of New York No Drawing. Application May 4, 1945, Serial No. 592,060

4 Claims. (Cl. 260—78.4)

My invention relates to new and valuable resins made by condensations under polymerizing conditions of polybasic acids, and polybasic anhydrides, with hydro-aromatic-ortho-diols, or hydro-aromatic-ortho-oxides, or mixtures thereof.

I have found that when a polybasic acid or anhydride like phthalic, maleic, fumaric, succinic, malic, malonic, citric, glycollic, tartaric, adipic, sebacic, azelaic, suberic, trimellitic, etc., is condensed with cyclohexene oxide or with any of the various possible forms of 1.2-cyclohexanediol, or any mixture of these forms, or with a mixture of cyclohexene oxide and any of the forms of 1.2-cyclohexanediol, either alone or in the form of their mixtures, at a suitable temperature, for a suitable period of time, under such conditions that the water, formed during the reaction, is removed, the condensation being carried out preferentially in an atmosphere of an inert gas, the resulting products are resins of great value.

The graphic formula for cyclohexene oxide (cyclohexane-1,2-epoxy) is

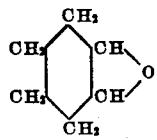

The words "1.2-cyclohexeneoxide" and "cyclohexeneoxide" are used herein to designate the same chemical compound.

The graphic formula for cis-1-2-cyclohexanediol and for trans-1-2-cyclohexanediol is

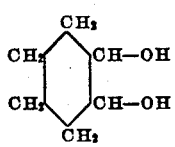

The ratios of the cyclohexeneoxide or cyclohexanediol to the polybasic acid are usually equimolar, or, if desired, an excess of cyclohexeneoxide or cyclohexanediol may be employed.

These new resins range in consistency from soft to very hard and brittle and have good solubilities in organic solvents such as aliphatic and aromatic hydrocarbons, alcohols, ethers, ketones and hydrogenated solvents. Their acid numbers cover a wide range, depending on the polybasic acid employed, the ratio of the cyclohexeneoxide or cyclohexanediol to the acid and the temperature and length of time of heating.

Most of the straight resins, without any modification, are compatible with nitrocellulose lacquers and may be directly blended with them.

The following are examples of processes for the production of some of the resins of my invention.

Example I 24.5 p. 1.2-cyclohexene oxide are mixed with 41.5 p. ortho phthalic acid, and the mixture is heated, while stirring, to 30°–40° C. A very exothermic reaction takes place. When the temperature begins to drop, the liquefied product is heated during one hour to 220°–230° C. and kept at this temperature for about two hours. The water liberated at this temperature will gradually escape. The obtained resin is cooled and ground. The resulting brittle resin is soluble in toluol, hydrogenated mineral oils, mixtures of toluol and butyl acetate, acetone, 95% ethyl alcohol, and in butyl alcohol. The resulting resin has similar properties, even if a 20% excess of cyclohexene oxide is used instead of equimolar weights.

Example II.—Succinic resin

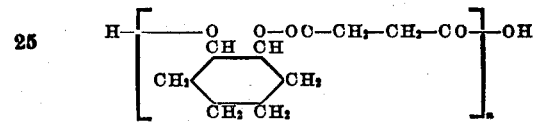

34.3 p. of 1.2-cyclohexeneoxide are mixed in a 3-neck flask, plunged in an oil bath with 41.3 p. of succinic acid, and the mixture is heated to 85°–95° C.

The exothermic reaction raises the temperature to about 180° C. The liquefied product is kept for a suitable time at 220–230° C. and treated as in Example I.

The resulting resin is somewhat soft and has properties similar to the phthalic resin.

Example III.—Maleic resin

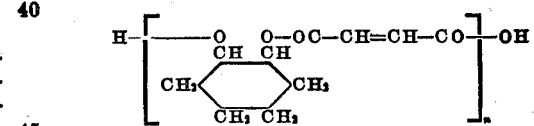

46.4 p. of maleic acid are charged in a 3-neck flask fitted with an agitator and an air condenser.

39.2 p. of 1.2-cyclohexeneoxide are slowly added in small portions, the reaction being very exothermic.

When all oxide is added, the product is heated to 220°–230° C. and kept at this temperature for about one hour.

The finished resin is very hard and transparent and possesses good solubilities in organic solvents.

Example IV.—Citric resin 57.6 p. of citric acid and 44.1 p. of 1.2-cyclohexeneoxide are heated together at 220°–230° C. The resulting resin has a marked trend toward the formation of filaments and fibers.

Because of possible cross linkings and interesterification of the OH group of the citric acid, any stated formula would only be problematical.

Example V.—Phthalic resin 44.4 p. of phthalic anhydride are melted with 38.38 p. of cis-cyclohexane-ortho-diol, $CO_2$ being bubbled through the agitated, molten mass. The temperature is raised to 220°–230° C. and kept until the reaction is considered finished.

The resulting resin is soluble in toluol, hydrogenated mineral oil, mixtures of toluol and butylacetate, acetone, alcohol 95%, butyl alcohol, and the toluol or hydrogenated mineral oil solution of the resin is compatible with the commercial nitrocellulose lacquers.

Example VI 38.4 p. citric acid anhydrous and 69.6 p. "trans" 1.2 cyclohexanediol M. P. 99°–100° C. are heated together in a closed vessel, provided with a stirring device, thermometer, tube for carbon dioxide gas, and an air condenser, adjusted in order that the water formed during the reaction may escape slowly. The reaction mixture is heated during one hour to 185°–190° C. under constant stirring and addition of carbon dioxide gas. The temperature is maintained at 190° C. for another three hours. Then the product is allowed to cool to 160° C. At this temperature 26 p. phthalic anhydride and 7 p. succinic anhydride are added and the mixture heated to 215°–220° C. during fifty minutes and kept at this temperature for about six hours. After pouring the molten mass on pans and cooling, a yellow, transparent, tough resin is obtained. The product is readily soluble in butyl acetate, butyl alcohol, toluol, acetone, mixtures of butyl acetate and toluol, naphtha solvents, mixtures of benzol-ethyl alcohol and is compatible with nitrocellulose lacquers.

Example VII 83 p. phthalic acid, 30 p. 1.2-cyclohexene oxide, 29 p. "trans" 1.2 cyclohexanediol (M. P. 99°–100° C.) are heated together in the apparatus described in Example VI for one hour to 225°–230° C., while carbon dioxide gas is passed through the molten mass. After three hours of heating at this temperature, a slightly brownish, hard, brittle resin is obtained. Its solubilities in organic solvents are similar to those of the resin in Example I.

Example VIII 60 p. maleic anhydride, 36.54 p. "cis" 1.2-cyclohexanediol (M. P. 104° C.), 36.54 p. "trans" 1.2-cyclohexanediol (M. P. 99°–100° C.) are reacted together at 225°–230° C. for about two hours. The product resulting from this condensation is similar to those mentioned for the resin of Example III.

The following are mentioned from the aromatic dicarboxylic acids which can be successfully applied in my described process: phthalic acid, tetrahydrophthalic acid, diphenic acid, 1.8-naphthalic acid and camphoric acid.

The following are mentioned from the aromatic tricarboxylic acids which can be used by replacing the equimolecular quantity in Example V and Example VIII: hemimellitic acid, trimellitic acid and pyromellitic acid.

It will be noted from the foregoing that my invention is directed to new synthetic resins having valuable properties when employed alone and when used in connection with compatible chemicals; and that the examples are set forth solely for the purpose of clearly defining my invention and that, therefore, they are not a limitation as to the particular chemicals, quantities, temperatures, proportions or steps of procedure within the scope of my invention.

What I claim is:

1. Resins produced by the polymeric condensation of about 1 to 1.20 mols of 1:2-cyclohexene oxide with 1 mol of a dicarboxylic acid, in which the sole reactive groups are the respective carboxylic acid and the 1:2 epoxy groups, the said resins being soluble in toluol, hydrogenated mineral oils, mixtures of toluol and butyl acetate, acetone, ethyl alcohol, and butyl alcohol.

2. Resins of claim 1 in which the dicarboxylic acid is phthalic acid.

3. Resins of claim 1 in which the dicarboxylic acid is succinic acid.

4. Resins of claim 1 in which the dicarboxylic acid is maleic acid.

MICHEL F. CUKIER.

REFERENCES CITED

The following references are of record in the file of this patent:

UNITED STATES PATENTS

| Number | Name | Date |
|---|---|---|
| 1,860,098 | Jaeger | May 24, 1932 |
| 2,048,774 | Bolton | July 28, 1936 |
| 2,054,979 | Jahrstorfer et al. | Sept. 22, 1936 |
| 2,056,656 | Ellis | Oct. 6, 1936 |
| 2,212,151 | Coffman et al. | Aug. 20, 1940 |

FOREIGN PATENTS

| Number | Country | Date |
|---|---|---|
| 500,300 | Great Britain | May, 1938 |